United States Patent
Palum et al.

(10) Patent No.: US 7,593,597 B2
(45) Date of Patent: Sep. 22, 2009

(54) ALIGNMENT OF LENS ARRAY IMAGES USING AUTOCORRELATION

(75) Inventors: Russell J. Palum, Rochester, NY (US); Heidi L. Hall, Webster, NY (US); John F. Hamilton, Jr., Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 535 days.

(21) Appl. No.: 10/899,761

(22) Filed: Jul. 27, 2004

(65) Prior Publication Data

US 2005/0057664 A1    Mar. 17, 2005

Related U.S. Application Data

(60) Provisional application No. 60/492,916, filed on Aug. 6, 2003.

(51) Int. Cl.
```
G06K 9/64    (2006.01)
G06K 9/00    (2006.01)
H04N 5/235   (2006.01)
H04N 5/228   (2006.01)
```
(52) U.S. Cl. ............... 382/278; 382/154; 348/222.1
(58) Field of Classification Search ........... 382/107, 382/154, 278; 348/222.1
See application file for complete search history.

(56) References Cited

U.S. PATENT DOCUMENTS

| | | | |
|---|---|---|---|
| 3,971,065 A | 7/1976 | Bayer | 348/276 |
| 5,208,674 A | 5/1993 | Setchell, Jr. | 348/269 |
| 5,220,441 A * | 6/1993 | Gerstenberger | 358/487 |
| 5,453,840 A * | 9/1995 | Parker et al. | 356/400 |
| 5,530,514 A * | 6/1996 | Lisson et al. | 396/114 |
| 5,835,639 A | 11/1998 | Honsinger et al. | 382/278 |
| 6,711,303 B1 | 3/2004 | Honsinger | 382/289 |
| 2001/0036307 A1* | 11/2001 | Hanna et al. | 382/154 |
| 2002/0061131 A1 | 5/2002 | Sawhney et al. | 382/154 |
| 2003/0026474 A1* | 2/2003 | Yano | 382/154 |
| 2003/0111593 A1 | 6/2003 | Mates | 250/216 |
| 2004/0179834 A1* | 9/2004 | Szajewski et al. | 396/333 |

FOREIGN PATENT DOCUMENTS

WO    WO93/11631 A    6/1993

OTHER PUBLICATIONS

IEICE Trans. Electron., vol. E84-C, No. 12, Dec. 2001, Paper Special Issue on Integrated Systems With New Concepts, "Opto-Electronic Integrated Information System", Jun Tanida, Keiichiro Kagawa and Kenji Yamada, pp. 1778-1784.

* cited by examiner

*Primary Examiner*—John B Strege
(74) *Attorney, Agent, or Firm*—Robert Luke Walker; Justin D. Petruzzelli (57) ABSTRACT

In a parallax correction method and system, corresponding regions of first and second digital images of the same subject are upsampled to provide a pair of upsampled regions. The corresponding regions have parallax. The upsampled regions are statistically compared at a plurality of relative subpixel offsets to provide a corresponding plurality of similarity values. The similarity values define a peak similarity value and a corresponding peak subpixel offset among the plurality of relative subpixel offsets. The second digital image is shifted relative to the first digital image by the peak subpixel offset.

14 Claims, 6 Drawing Sheets

ALIGNMENT OF LENS ARRAY IMAGES USING AUTOCORRELATION

CROSS REFERENCE TO RELATED APPLICATIONS

This is a 111A application of Provisional Application Ser. No. 60/492,916, filed on Aug. 6, 2003.

FIELD OF THE INVENTION

The invention relates to digital image processing and more particularly relates to alignment of lens array images using autocorrelation.

BACKGROUND OF THE INVENTION

Small and thin handheld portable devices are preferred by many users. In relation to picture taking, this presents a need for thin imaging systems. Camera size, particularly in terms of thickness, is related to the size of the image plane. A normal lens focal length for a camera is generally accepted to be equal to the diagonal of an electronic imager or a frame of photographic film. By definition, meeting this criterion produces "correct" perspective or unit angular magnification. With a short focal length lens, the film or imager has to have a small diagonal. This leads to large print magnification for film systems or small pixels that tend to be noisy for electronic systems.

An array of lenses can be used with an imager to capture an array of images of a scene. "Opto-Electronic Integrated Information System", by Tanida, J. et al., *IEICE Trans. Electron.*, Vol. E84-C, No. 12, December 2001, pages 1778-1784, discloses a system having an array of lenses over an imager and a separator that prevents cross talk between lenses. Such a system can include a color filter array, as disclosed in US 2003/0111593. The normal lens focal length for this type of system is the diagonal of the small section of the imager that the respective lens covers. Because the focal length of the individual lenses is shorter than it would be for the whole imager, this provides a thin optical system. The multiple images of the same scene are each captured at a relatively low resolution. The images can be added together to reduce noise and/or increase resolution. The pixels under each lens can be offset by a small part of a pixel pitch so that each image will have the same pixel pitch with a small offset. The separate images can be used to fill in a higher sampling frequency grid than the grid under one lens. Alternatively, if the images are identical and aligned to the pixel pitch, then multiple images can be averaged pixel by pixel to produce a lower noise image.

These systems have not addressed parallax issues for objects that are close to the camera. For example, a system based on a current megapixel sensor with approximately 4 micron pixels requires a 3 mm focal length lens. In this case the foreground will be shifted relative to the background about 2 pixels in the captured images. The shift leads to a loss of resolution and, depending on the system design, color fringes in the image. Therefore, there exists a need to address parallax issues for images captured by thin imaging systems at distances less than infinity.

Autocorrelation of images of the same scene from different sources is well known. U.S. Pat. No. 5,835,639 uses autocorrelation in detecting rotation and magnification of an image bearing an embedded marker. US 2002/0061131 discloses the use of correlation and warping in the preparation of depth images. U.S. Pat. No. 5,453,840 discloses a procedure for aligning two sensors using cross correlation. U.S. Pat. No. 5,530,514 discloses a system for autofocusing by deriving parallax range using autocorrelation of signals from two linear sensor arrays.

It would thus be desirable to provide methods and apparatus, in which parallax is corrected in producing final images from a plurality of images captured by sections of a capture unit, each section having one of an array of lenses.

SUMMARY OF THE INVENTION

The invention is defined by the claims. The invention, in broader aspects, provides a parallax correction method and system, in which corresponding regions of first and second digital images of the same subject are upsampled to provide a pair of upsampled regions. The corresponding regions have parallax. The upsampled regions are statistically compared at a plurality of relative subpixel offsets to provide a corresponding plurality of similarity values. The similarity values define a peak similarity value and a corresponding peak subpixel offset among the plurality of relative subpixel offsets. The second digital image is shifted relative to the first digital image by the peak subpixel offset.

It is an advantageous effect of the invention that an improved methods and apparatus, in which parallax is corrected in producing final images from a plurality of images captured by sections of a capture unit, each section having one of an array of lenses.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

In the method and system, a set of images of the same scene, captured using an array of lenses, are corrected for lens-to-lens parallax. Object distance is not used in the correction. The images are captured digitally using an image sensor or are scanned and digitized, after capture on photographic film and processing of the film to provide scannable hard copy images. Parallax errors are corrected by shifting the images relative to the other by subpixel distances, so as to remove respective parallax offsets. The images are then combined. The amount and direction of the shifts are determined by selecting corresponding regions of a pair of the digital images, upsampling those corresponding regions, and then comparing, preferably by autocorrelation, the upsampled regions at different relative offsets. Each offset is an integer multiple of a subpixel unit dimension defined by the subsampling. The shift corresponding to a peak similarity measure, such as an autocorrelation peak value, is applied to one of the pair of digital images, using interpolation to provide subpixel offsets. The same procedure is repeated for other images of the set, alternatively, the calculated shift is used, in combination with the known geometry of the array to determine appropriate shifts for the remaining images.

In this description, some embodiments of the present invention will be described, in which features are provided by software programs. Those skilled in the art will readily recognize that the equivalent of such software may also be constructed in hardware. Because image manipulation algorithms and systems are well known, the present description will be directed in particular to algorithms and to system features relating to the algorithms. Other aspects of such algorithms and systems, and hardware and/or software for producing and otherwise processing the image signals and other signals involved herein can be selected from such systems, algorithms, components, and elements known in the art. Given the description as set forth in the following specification, all software implementation thereof is conventional and within the ordinary skill in such arts.

Some portions of the detailed descriptions which follow are presented in terms of algorithms and symbolic representations of operations on data bits within a computer memory. These algorithmic descriptions and representations are used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. For convenience, these signals as sometimes referred to herein in relation to the underlying information using referents such as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "calculating" or "determining" or the like, refer to the action and processes of a computer system, or similar data processing device, that manipulates and transforms data represented as physical (e.g. electronic) quantities within the computer system's registers and memories into other data similarly represented as physical quantities within the computer system memories or registers or other such information storage, transmission or display devices.

The present invention also relates to systems including specific pieces of apparatus for performing the operations described herein. Apparatus such as a programmable computer can be specially constructed for the required purposes, or may comprise a general purpose computer selectively activated or reconfigured by a computer program stored in the computer.

The algorithms presented herein are not inherently related to any particular computer or other apparatus. Various general purpose systems can be used with programs in accordance with the teachings herein, or it may prove convenient to construct more specialized apparatus to perform the methods. The structure for a variety of these systems will appear from the description below. In addition, the present invention is not described with reference to any particular programming language. It will be appreciated that a variety of programming languages can be used to implement the teachings of the invention as described herein.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art.

Elements not specifically shown or described herein can be selected from those known in the art. Certain aspects of the embodiment to be described can be provided in software. Given the methods and systems as shown and described herein, software not specifically shown, described or suggested herein that is useful for implementation of the invention is conventional and within the ordinary skill in such arts. It will be understood that the system and method may embody algorithms and processes not specifically shown or described herein that are useful for implementation. Such algorithms and processes are conventional and within the ordinary skill in such arts.

The computer program for performing the method of the present invention can be stored in a computer readable storage medium. This medium may comprise, for example: magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of a local or remote network or other communication medium. Those skilled in the art will readily recognize that the equivalent of such a computer program product may also be constructed in hardware or firmware known as application specific integrated circuits (ASICs). An ASIC can be designed on a single silicon chip to perform the method of the present invention. The ASIC can include the circuits to perform the logic, microprocessors, and memory necessary to perform the method of the present invention. Multiple ASICs can be envisioned and employed as well for the present invention.

A computer or machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices;

electrical, optical, acoustical or other form of propagated signals (e.g., carrier waves, infrared signals, digital signals, etc.); etc.

The present invention can be employed in a variety of user contexts and environments. Exemplary contexts and environments include, without limitation, wholesale digital photofinishing (which involves exemplary process steps or stages such as film in, digital processing, prints out), retail digital photofinishing (film in, digital processing, prints out), home printing (home scanned film or digital images, digital processing, prints out), desktop software (software that applies algorithms to digital prints to make them better or even just to change them), digital fulfillment (digital images in—from media or over the web, digital processing, with images out—in digital form on media, digital form over the web, or printed on hard-copy prints), kiosks (digital or scanned input, digital processing, digital or hard copy output), mobile devices (e.g., PDA or cell phone that can be used as a processing unit, a display unit, or a unit to give processing instructions), and as a service offered via the World Wide Web. Systems can use, without limitation, portable and/or non-portable components and/or components provided via a local or remote network, such as the Internet or a cellular or publicly switched telephone network.

In each case, the invention may stand alone or can be a component of a larger system solution. Furthermore, human interfaces, the display to a user (if needed), the input of user requests or processing instructions (if needed), the output, can each be on the same or different devices and physical locations, and communication between the devices and locations can be via public or private network connections, or media based communication. Where consistent with the disclosure of the invention, the methods can be fully automatic, may have user input (be fully or partially manual), may have user or operator review to accept/reject the result, or can be assisted by metadata (metadata that can be user supplied or supplied automatically). Moreover, the algorithm(s) may interface with a variety of workflow user interface schemes.

Figure 3:
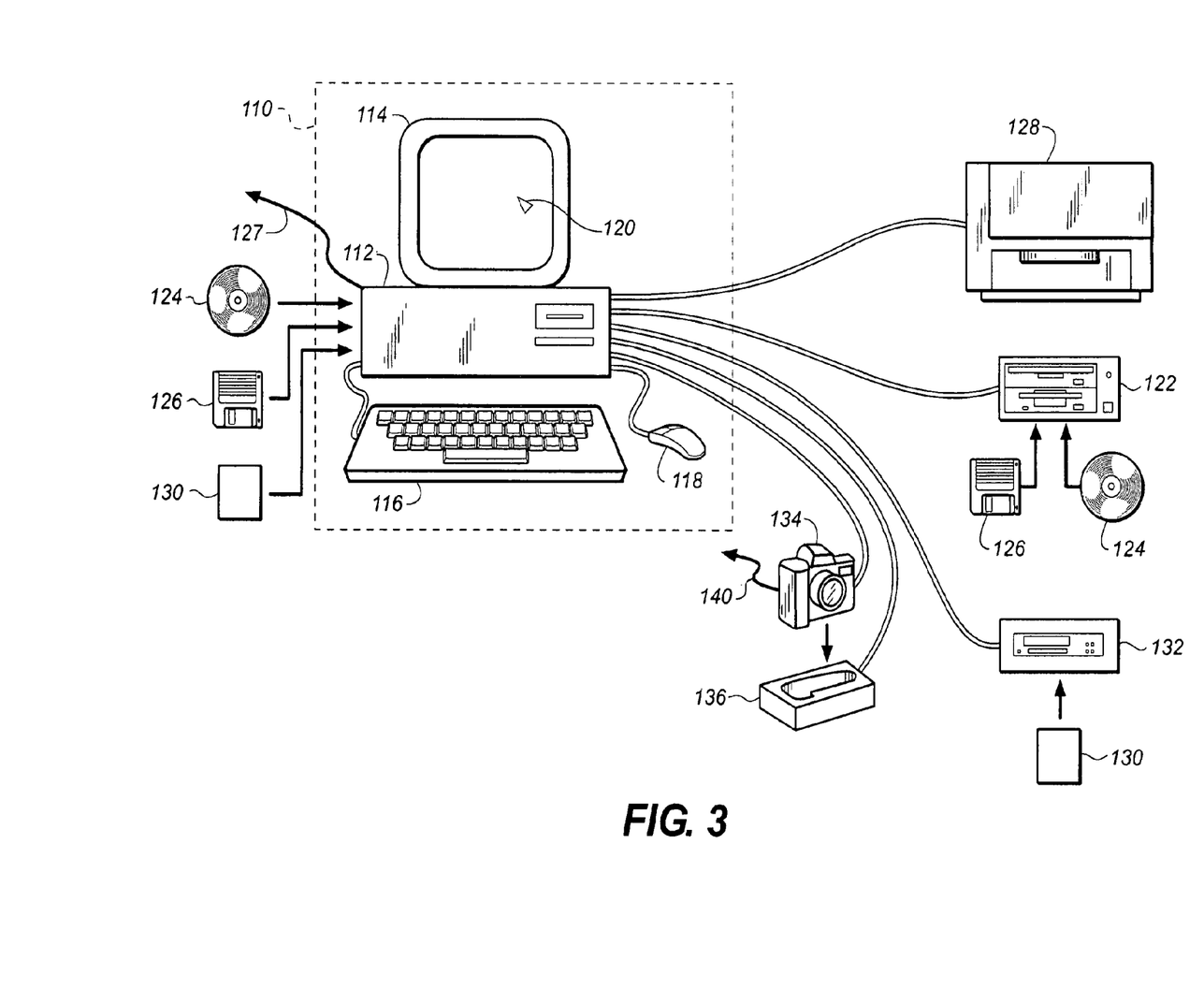
FIG. 3 generally illustrates features of a system in accordance with the present invention.

The present invention can be implemented in computer hardware. Referring to FIG. 3, there is illustrated a computer system 110, which includes a microprocessor-based unit 112 for receiving and processing software programs and for performing other processing functions. The microprocessor-based unit 112 can be programmed, as is well known in the art, for storing the software program internally. A display 114 is electrically connected to the microprocessor-based unit 112 for displaying user-related information associated with the software, for example, by means of a graphical user interface. A keyboard 116 is also connected to the microprocessor based unit 112 for permitting a user to input information to the software. As an alternative to using the keyboard 116 for input, a mouse 1 18 can be used for moving a selector 120 on the display 114 and for selecting an item on which the selector 120 overlays, as is well known in the art.

A compact disc (such as a CD-ROM, CD-R, or CD-RW disc) 124 can be inserted into the microprocessor based unit or a connected input device 122 for inputting the software programs and digital images to the microprocessor based unit 112. A floppy disk 126 or other portable memory 130 can be used in the same manner. The microprocessor-based unit 112 can also have a network connection 127, such as a telephone line, to an external network, such as a local area network or the Internet. A printer 128 can also be connected to the microprocessor-based unit 112 for printing hardcopy output from the computer system 110.

Images and videos can also be displayed on the display 114 via a personal computer card (PC card) 130, such as, as it was formerly known, a PCMCIA card (based on the specifications of the Personal Computer Memory Card International Association) which contains digitized images electronically embodied in the card 130. The PC card 130 is inserted into the microprocessor based unit 112 or an externally located PC card reader 132 connected to the microprocessor-based unit 112. Images can be input via the compact disk 124, the floppy disk 126, or other portable media or through the network connection 127. Images can be input through a direct connection to a digital image acquisition device 134 (illustrated as a camera) or via a suitable dock or other connection device 136 or via a wireless connection 140 to the microprocessor-based unit 112.

The output device of the system provides a final image that has been subject to parallax correction. The output device can be a printer or other output device that provides a paper or other hard copy final image. The output device can also provide the final image as a digital file located in fixed or portable memory or transmitted through a network. The output device can also includes combinations of output, such as a printed image and a digital file on a memory unit, such as a CD or DVD.

The present invention can be used on multiple capture devices that produce digital images. For example, FIG. 3 can represent a digital photofinishing system where the image capture device is a conventional photographic film camera for capturing a scene on color negative or reversal film, and a film scanner device for scanning the developed image on the film and producing a digital image.

The capture device can also be an electronic capture unit having an electronic imager, such as a charge coupled device (CCD), charge injection device (CID), or CMOS imager. The electronic capture unit can have an analog-to-digital converter/amplifier that receives the signal from the electronic imager, amplifies and converts the signal to digital form, and transmits the image signal to the digital image processor.

The microprocessor-based unit 112 includes a digital image processor (not separately illustrated) that provides the means for processing the digital images in accordance with the invention and to produce pleasing looking images on the intended output device or media. For example, the digital image processor can be used to process digital images to make adjustments for overall brightness, tone scale, image structure, etc. of digital images in a manner such that a pleasing looking image is produced by an image output device.

It should also be noted that the present invention can be implemented in a combination of software and/or hardware and is not limited to devices which are physically connected and/or located within the same physical location. One or more of the devices illustrated in FIG. 3 may be located remotely and can be connected via a network. One or more of the devices can be connected wirelessly, such as by a radio-frequency link, either directly or via a network.

Figure 10:
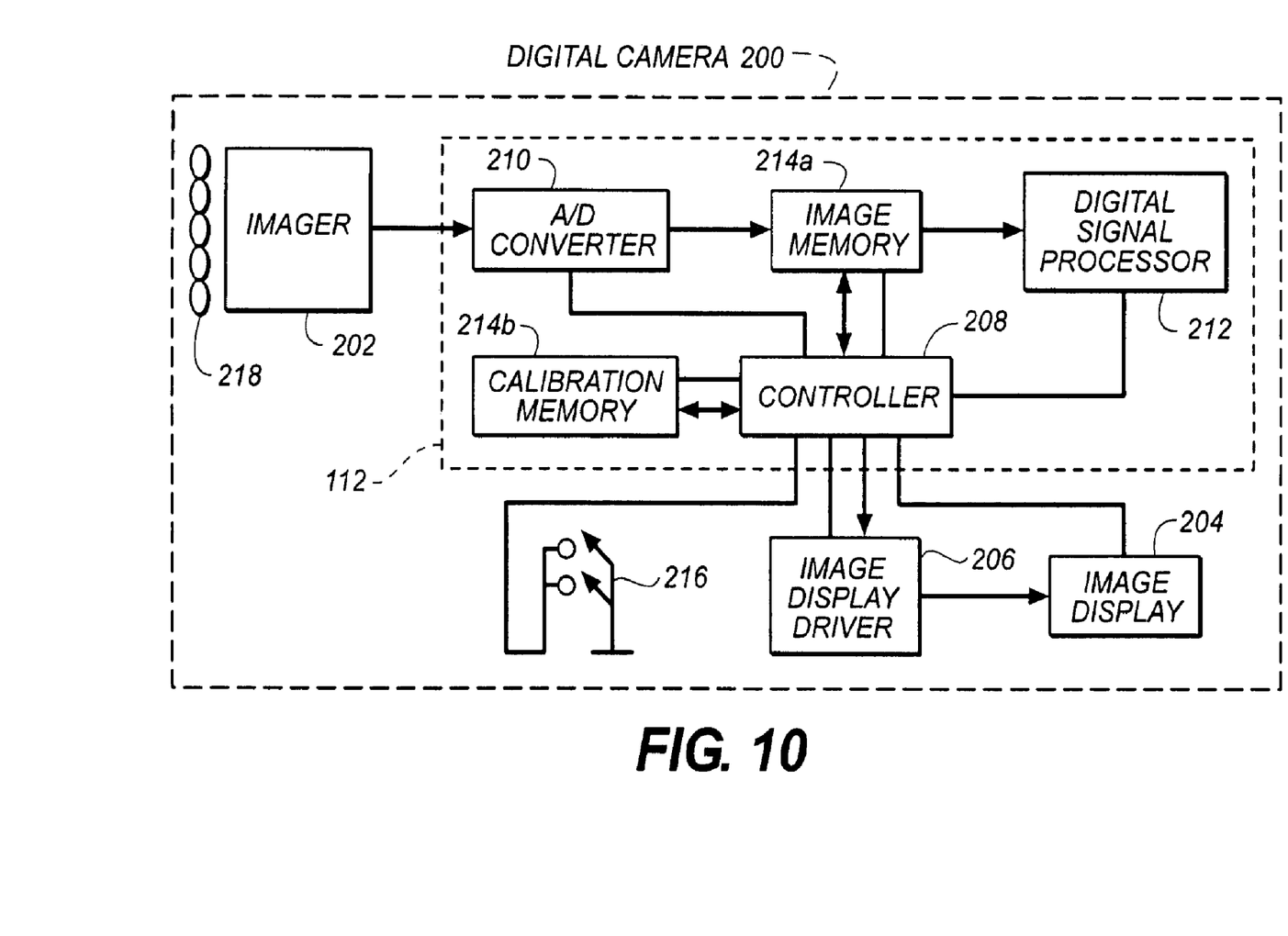
FIG. 10 is a diagrammatical view of another embodiment of the system.

Referring to FIG. 10, in a particular embodiment, the system is provided in the form of a digital camera 200, which includes an imager 202 that provides an output signal to a microprocessor-based unit 112. The microprocessor-based unit 112 operates an image display 204 utilizing an image display driver 206. The microprocessor-based unit 112 controls the other components of the camera and performs processing related to the electronic image. The microprocessor-based unit 112 includes a controller 208, an analog-to-digital converter 210, a digital signal processor 212, and memory (image memory 214a and calibration memory 214b are shown). "Memory" refers to one or more suitably sized logical units of physical memory provided in the form of semiconductor memory, or magnetic memory, or the like. For example the memory can be an internal memory, or removable memory, or a combination of both. The controller and digital signal processor can be controlled by software stored in the same physical memory that is used for image storage, but is preferred that the processor and controller are controlled by firmware stored in dedicated memory (not separately illustrated). A shutter switch 216, such as a two-position shutter button well known to those of skill in the art, is operatively connected to the controller. The controller is connected to and provides display images to an image display. The controller operates the image display using an image display driver. Drivers (not shown) are provided for other components. The electronic image captured by the imager is amplified and converted by the analog-to-digital converter to a digital electronic image, which is to then processed into the digital signal processor and stored in an image memory. The controller includes a timing generator that supplies control signals for all electronic components in timing relationship. Calibration values for the individual camera are stored in a calibration memory and supplied to the controller. Signal lines, illustrated as a data bus, electronically connect the camera components. The camera has a body that holds the other components.

In each case, the methods and systems described herein may stand alone or may be parts of a larger method or system. Furthermore, human interfaces, e.g., the scanning or input, the digital processing, the display to a user (if needed), the input of user requests or processing instructions (if needed), the output, can each be on the same or different devices and physical locations, and communication between the devices and locations can be via public or private network connections, or media based communication. Where consistent with the foregoing disclosure of the present invention, the method of the invention can be fully automatic, may have user input (be fully or partially manual), may have user or operator review to accept/reject the result, or may be assisted by metadata (metadata that may be user supplied, supplied by a measuring device (e.g. in a camera), or determined by an algorithm). Moreover, the algorithm(s) may interface with a variety of workflow user interface schemes.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art.

A digital image includes one or more digital image channels or color components. Each digital image channel is a two-dimensional array of pixels. Each pixel value relates to the amount of light received by the imaging capture device at the physical region of the pixel. For color imaging applications, a digital image will often consist of red, green, and blue digital image channels. Motion imaging applications can be considered a sequence of digital images and can be processed as individual images or by processing a first image in a particular sequence and estimating changes necessary for succeeding images. The methods and systems are described herein in relation to two dimensional arrays of pixels arranged by rows and columns, those skilled in the art will recognize that the present invention can be applied to non-rectilinear arrays with equal effect. Those skilled in the art will also recognize that for digital image processing steps described hereinbelow as replacing original pixel values with processed pixel values is functionally equivalent to describing the same processing steps as generating a new digital image with the processed pixel values while retaining the original pixel values.

Referring to the embodiment of FIG. 10, a lens array 218 is disposed over the imager of the camera. The lens array has a plurality of lenses arranged in rows and columns. Each lens of the array directs a light image of the same scene to a corresponding section of the imager. In the embodiments disclosed in detail herein, the lenses and sections are uniform, sections do not overlap, and the sections taken together occupy all of the active area of the imager, that is, the area used for image capture. These features are currently preferred in order to reduce complexity in image processing, but are not limiting on the systems and methods herein discussed.

Each section of the imager has a separate grid of pixels that captures light propagated through an individual one of the array of lenses. The number of pixels in each section is sufficient to a capture an image of the scene. The number of pixels is necessarily greater than one and, preferably, in the hundreds or thousands. The imager can be monochromatic or can be provided with a color filter array (CFA), in the manner well known to those of skill in the art. In the embodiments discussed in detail herein, a Bayer pattern CFA is provided on the imager.

In the embodiment of FIG. 3, digital images can be provided by a film camera having a lens array like those just discussed. The film is digitized by the scanner to provide a digital copy of the negative, transparency, or photographic print of the scene image initially captured using a photographic film camera.

Figure 1:
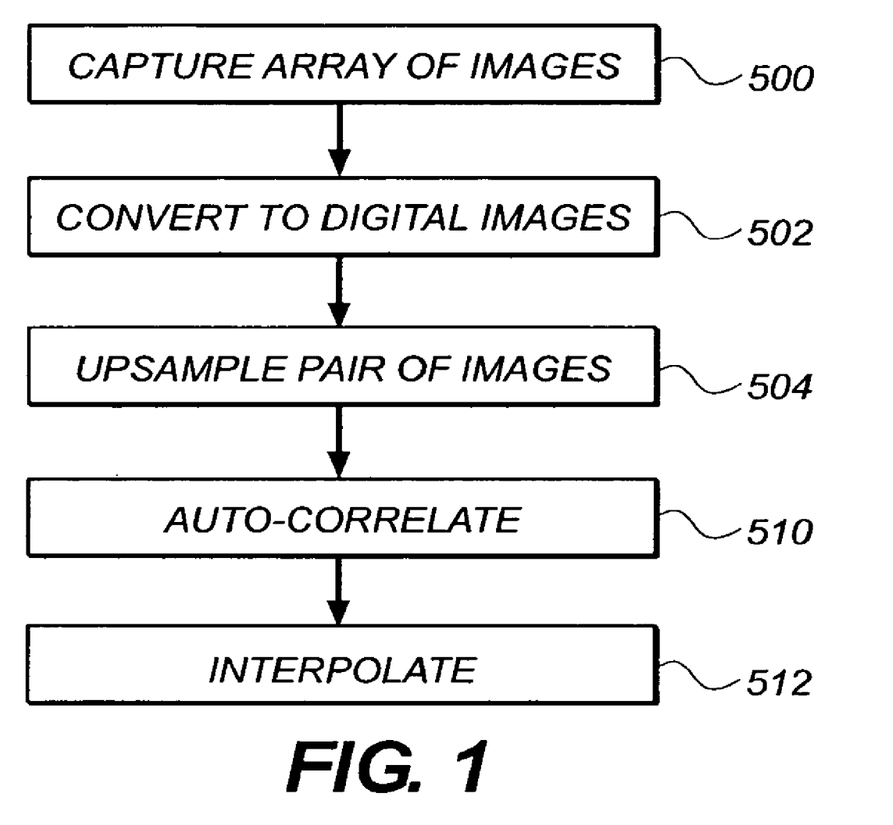
FIG. 1 is a flow chart of an embodiment of the method of the invention.
Figure 2:
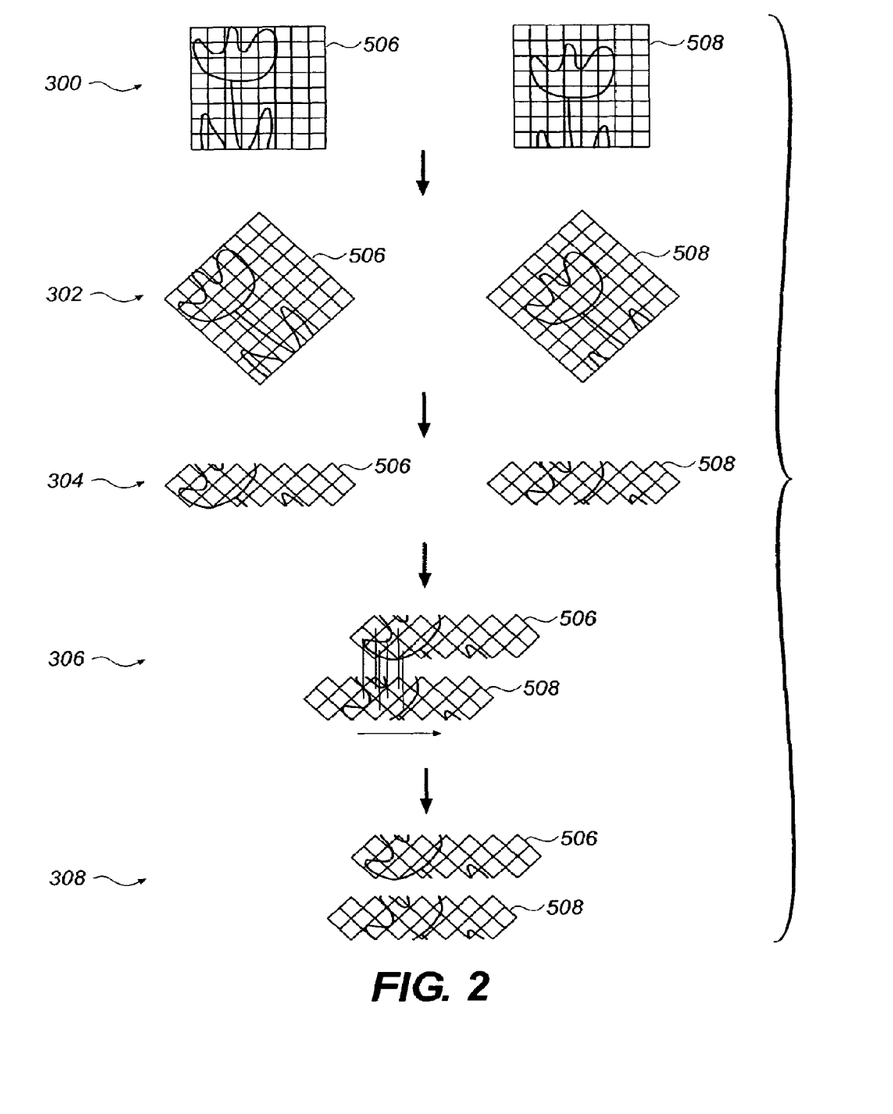
FIG. 2 is a diagram of the autocorrelation of the method of FIG. 1.

Referring now to FIGS. 1-2, in an embodiment of the method, an array of captured images are captured (500) using the imager of a digital camera. After capture, each of the captured images is digitized (502) by an analog-to-digital converter and the digital images are sent to the digital signal processor. Each of the digital images is from a different section of the imager, utilizing a different lens of the lens array. The digital images each represent the same scene, but differ because of parallax due to the offset between different lenses.

Figure 5:
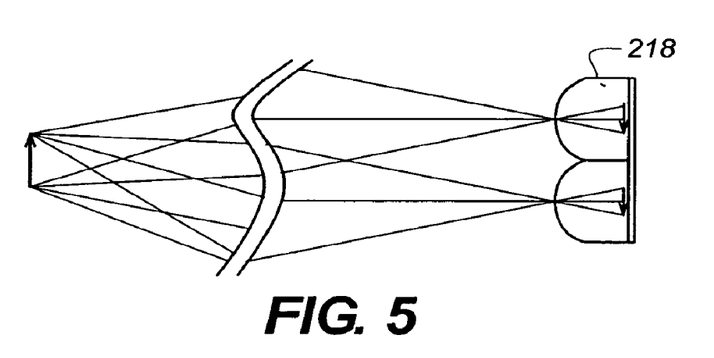
FIG. 5 is a diagram of image formation by two adjoining lenses of the lens array on corresponding sections of the imager, when the imaged object is at infinity for the respective lenses.
Figure 6:
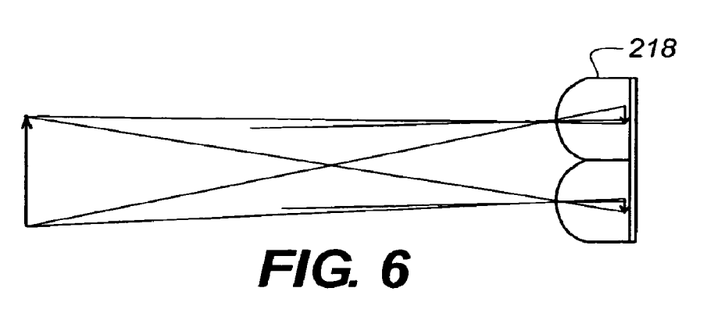
FIG. 6 is a diagram of image formation by the two adjoining lenses of FIG. 6, but with the imaged object close enough to the imager to cause parallax.

Parallax is a function of the distance between a photographed object and the camera. As shown in FIG. 5, when an object is at infinity, the relative image positions of the object on different sections of the imager are all the same. (The term "infinity" is used in an ordinary photographic sense, to mean an object distance so great that the sharpest image is formed at a distance from the lens equal to the focal length of the optical system.) As shown in FIG. 6, when the object gets closer to the camera, the relative image positions of the object on different sections of the imager change due to parallax.

Figure 7:
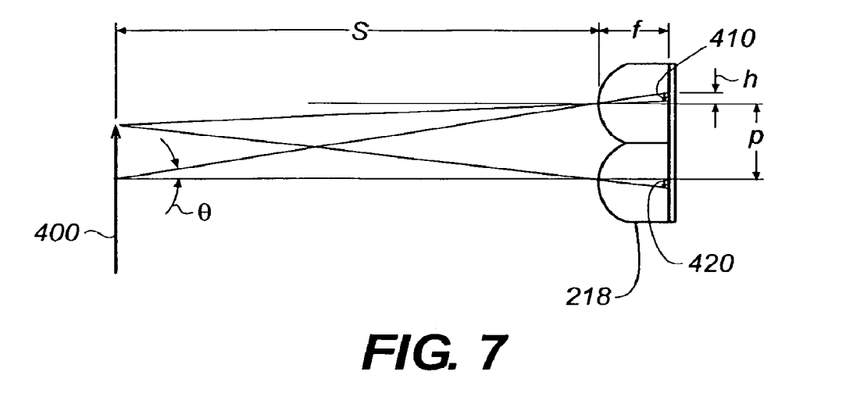
FIG. 7 is a diagram illustrating parameters used to calculate the image displacement due to parallax.
Figure 8:
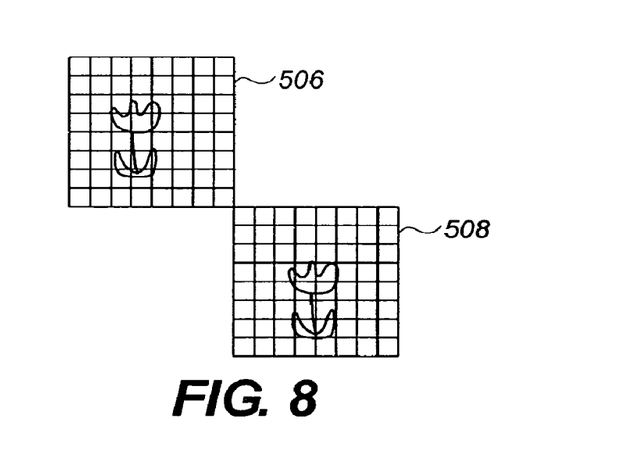
FIG. 8 is a diagrammatical view of two diagonally adjoining sections of the imager of FIG. 5.
Figure 9:
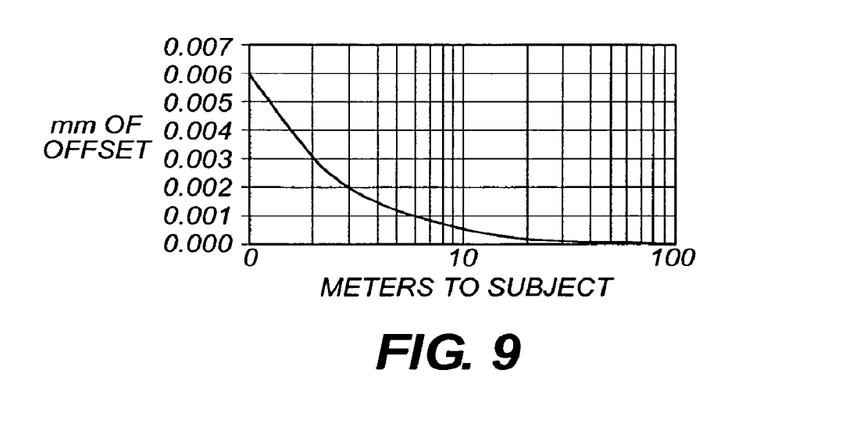
FIG. 9 is a diagram of parallax induced image offset in the apparatus of FIG. 3.

FIG. 7 illustrates the relationships between the object and the images on the sections of the imager. The image of the arrow (400) is displaced in the upper section (410) relative to the lower section (420). In this case, the offset h is equal to $f*\tan(\theta)$. The tangent of $\theta$ is the pitch between the lenses divided by the distance to the object, S. In embodiments discussed herein, when the pitch between lenses and the focal length are similar in magnitude, the image position from section to section is offset by over a pixel, at subject distances between 1 meter and infinity. For a lens array with a pitch (p) of 2 mm and a lens focal length (f) of 3 mm, the graph in FIG. 9 shows the offsets that can be expected at different distances from the lens/imager system. For a 4-micron pixel, the nominal offset is 2 microns; when the parallax offset approaches half of this or 1 micron, the interpolation algorithm starts to break down. This occurs at about 6 meters or about 20 feet. Images in this range and closer are in the more frequently used part of photospace. The most frequently used part of photospace is about 1.5 to 2 meters.

The parallax offset is corrected, in the digital signal processor, by shifting the images so as to remove the parallax offset. The relative shift of one digital image relative to another is in an offset direction defined by the geometric relationship of the respective sections of the imager. The magnitude of the shift is determined by first upsampling (504) corresponding regions 506, 508 of two different digital images, then comparing (510) the upsampled regions at different offsets.

Each offset is a translation over a different distance in the same direction. The upsampling can be done using bilinear, bicubic, sinc, or any other interpolation technique of choice. Upsampling can be done in a stepwise sequence of offsets. Upsampling is illustrated herein at a ratio of two times the original number of pixels. This ratio is used only for purposes of illustration, since it is not particularly advantageous in actual use. A small ratio tends to inadequately remove and/or overcorrect parallax. It is advantageous to maximize the ratio within practical limits imposed by processor speed and memory. A convenient upsampling ratio is four to one.

The upsampling defines a subpixel unit dimension that replaces the pixels as the smallest indivisible unit of the images. It is preferred that the comparisons are at subpixel offsets having magnitudes that are integer multiples of the subpixel unit dimension, rather than interpolating additional locations for comparisons.

The upsampled regions of the digital images can be the entire image or corresponding smaller portions of the images. The upsampling of the entire image is not preferred, since this approach is computationally intensive, and provides little additional benefit over upsampling only a portion of each image. The regions each have a plurality of pixels that are sufficient in number to allow comparisons of acceptable accuracy at the different offsets. The corresponding regions also exhibit parallax. This constrains the subject matter that is included within a region. For example, corresponding regions cannot be limited to distant scenery, since parallax would not be present. Closer subject matter that would have parallax should be included.

In the embodiments illustrated herein, the corresponding upsampled regions are areas 514,516 of the same size at the same pixel locations in images from two different sections of the imager. The pair of upsampled regions can differ in size and/or pixel location, within the limitations that this is likely to increase computational requirements and that regions having different subject matter are not suitable for comparison.

The regions are located, within respective images so as to provide an acceptable match for the parallax error in the image. A single value can be used for the parallax of each image. The digital images can, alternatively, be divided into blocks and the parallax error can be corrected separately for each block. For example, each image can be divided into 9 blocks.

Upsampled regions can be located so as to correspond with known or expected subject matter in the image. For example, many images have subject matter centered. The region can be similarly centered. The location of the region can take into account image content determined, for example, by use of rangefinder data or image analysis.

After subsampling, the regions of the pair of images are compared at each of the different offsets. The comparisons yield a set of similarity measures. A shift providing the offset corresponding to the peak similarity measure (greatest similarity) is applied to one of the pair of digital images, using interpolation (512) to provide subpixel offsets.

It is preferred that the pair of regions are compared by autocorrelation. If the images are divided into blocks, then autocorrelation is applied to regions from each pair of blocks separately. Use of blocks is likely to necessitate warping in order to align the centers of each block of the resulting image in a smooth manner. Suitable warping procedures for aligning independently modified blocks are well known to those of skill in the art.

Figure 4:
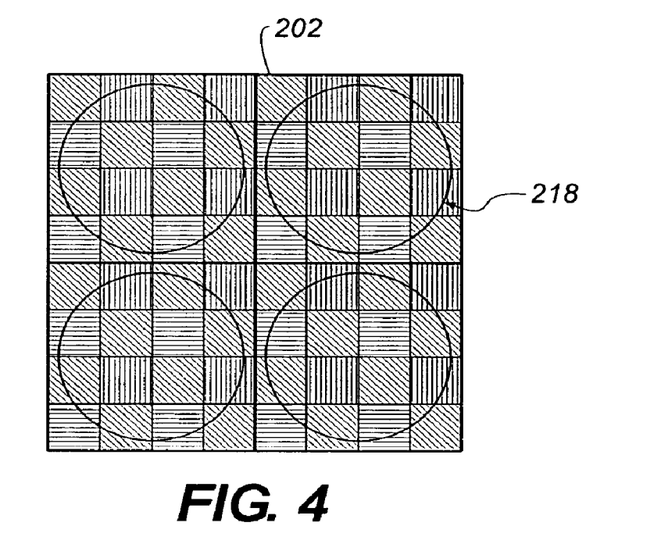
FIG. 4 is a semi-diagrammatical view of an imager of the image capture apparatus of FIG. 3. Darker lines indicate boundaries of sections. Cross-hatching indicates the green, blue, and red areas of an included Bayer pattern color filter.

FIG. 2 illustrates details of the upsampling and comparison of an embodiment of the method. Regions from two different sections of the imager are upsampled (300) shows a subsection of the imager in FIG. 4 that has been up-sampled by 2× along both axes. (A real system requires better than half pixel resolution so up-sampling 2× is not sufficient, but is shown only for the purpose of illustration.) The sections are rotated (302) 45 degrees. (The illustration is presented as an aid to understanding; this is done mathematically during image processing.) Some number of diagonal pixels are selected (304). (3 diagonal rows are shown here, although it is preferred that 5 or more diagonal rows be used in practice. It is also preferred that the upsampling be limited to the pixels needed for the comparison.) The two images are offset (306) by the maximum image offset that can be expected due to parallax and then corresponding pixels are multiplied together and summed. (A few of the corresponding pixels are shown in FIG. 2.) Attention has to be paid to housekeeping, the sums can be scaled to the number of pixels in each sum or the number of columns actually multiplied can be less than the number of columns in the rotated rows so the number of columns in each sum can be held constant. Sums are calculated for 1 subpixel offset increments. Comparisons are continued (308) until a peak value of the sum is found. The shift is based upon the peak offset.

After the shift for the first pair of images has been determined, the method can be repeated for one member of the first pair of images and each of the remaining digital images. Alternatively, the shift applied to one of the first pair of digital images can be used to derive unit shifts that are then applied, with appropriate multipliers to the remaining digital images. With a diagonal shift of the first pair of images and a rectangular lens array, unit shifts are components of the diagonal shift along height and width axes of the lens array. The spacing between lenses can be uniform or nonuniform. In either case, the geometry of the lens array and the lens used for each image are known. The shifts for each image are then simple calculations from the geometry and the unit shifts. A lookup table can be used to calculate the specific shifts applicable to the various sections of the imager from the shift for the first pair of images.

In the embodiments shown in the figures, lenses are provided in a uniformly spaced two-dimensional array. In this case, it is preferred that the members of the pair of digital images are diagonally offset from each other, since this allows easy calculation of horizontal and vertical components of the diagonal offset, which can be used to determine offsets for the remaining digital images. In a convenient embodiment, the members of the pair of digital images adjoin diagonally.

The shift can be calculated so as to align the pixels of the images of the set or to place the pixels of the images at a nominal displacement from each other. Alignment provides the benefit of reducing system noise. Nominal displacement can have the effect of replacing each pixel with respective subpixels from the image set so as to provide a higher resolution image, i.e., each pixel of the original image is replaced by a pixel (reduced to a subpixel) from a first section of the imager along with subpixels for other sections of the imager.

If the array has many sections, then multiple images can also be combined to reduce system noise of the subpixels used in the combined image.

The invention has been described in detail with particular reference to certain preferred embodiments thereof, but it will be understood that variations and modifications can be effected within the spirit and scope of the invention.

The invention claimed is:

1. A parallax correction method comprising the steps of:
    upsampling corresponding regions of first and second digital images of the same scene to provide a pair of upsampled regions, said corresponding regions having parallax;
    statistically comparing said upsampled regions at a plurality of relative subpixel offsets to provide a corresponding plurality of similarity values, said similarity values defining a peak similarity value and a corresponding peak subpixel offset among said plurality of relative subpixel offsets; and
    shifting said second digital image relative to said first digital image by said peak subpixel offset.

2. The method of claim 1 wherein each of said subpixel offsets is in the same direction.

3. The method of claim 1 wherein said shifting further comprises interpolating said first and second digital images in accordance with said peak subpixel offset.

4. The method of claim 1 wherein said comparing further comprises autocorrelating said subpixel images at said plurality of relative subpixel offsets and said peak similarity value is a peak autocorrelation value.

5. The method of claim 1 further comprising repeating said upsampling, comparing, and shifting steps for said first digital image and each of a plurality of additional digital images.

6. The method of claim 1 further comprising shifting each of a plurality of additional digital images relative to said first digital image and proportional to said peak subpixel offset.

7. The method of claim 1 further comprising:
    capturing a light image with each of a plurality of sections of a capture unit to provide a plurality of captured images, each of said sections being aligned with a corresponding one of an array of lenses;
    converting said plurality of captured images into a corresponding plurality of digital images, which includes said first and second digital images.

8. A parallax correction method comprising the steps of:
    upsampling corresponding regions of first and second digital images of the same subject to provide a pair of upsampled regions, said corresponding regions having parallax;
    statistically comparing said upsampled regions at a plurality of relative subpixel offsets to provide a corresponding plurality of similarity values, said similarity values defining a peak similarity value and a corresponding peak subpixel offset among said plurality of relative subpixel offsets; and
    shifting said second digital image relative to said first digital image by said peak subpixel offset, wherein
    said subpixel offsets each have a magnitude that is an integer multiple of a subpixel unit dimension defined by said upsampling.

9. A parallax correction method comprising the steps of:
    directing a plurality of light images of the same scene to a corresponding section of an imager via an array of individual lenses;
    providing each section of the imager with separate grid of pixels for capturing the plurality of light images of the same scene, each of the plurality of light images representing a different perspective of the same scene propagated through each of the individual lenses;
    upsampling corresponding regions of the plurality of light images representing a different perspective of the same scene from different sections of the imager scene to provide a plurality of upsampled regions of the same scene, said corresponding regions having parallax;
    statistically comparing said upsampled regions at a plurality of relative subpixel offsets to provide a corresponding plurality of similarity values, said similarity values defining a peak similarity value and a corresponding peak subpixel offset among said plurality of relative subpixel offsets; and
    shifting said second digital image relative to said first digital image by said peak subpixel offset.

10. The method of claim 9 wherein each of said subpixel offsets is in the same direction.

11. The method of claim 9 wherein said shifting further comprises the step of interpolating said first and second digital images in accordance with said peak subpixel offset.

12. The method of claim 9 wherein said comparing further comprises autocorrelating said subpixel images at said plurality of relative subpixel offsets and said peak similarity value is a peak autocorrelation value.

13. The method of claim 9 further comprising repeating said upsampling, comparing, and shifting steps for said first digital image and each of a plurality of additional digital images.

14. The method of claim 9 further comprising shifting each of a plurality of additional digital images relative to said first digital image and proportional to said peak subpixel offset.

* * * * *